United States Patent Office 3,154,553
Patented Oct. 27, 1964

3,154,553
METHYLATION OF PIPERAZINES
Eugene A. Weipert, Taylor, Mich., assignor to Wyandotte Chemicals Corporation, Wyandotte, Mich., a corporation of Michigan
No Drawing. Filed June 21, 1961, Ser. No. 118,540
12 Claims. (Cl. 260—268)

This invention relates to a process for the preparation of N,N′-dimethylpiperazines. More particularly, this invention relates to a process for preparing N,N′-dimethylpiperazines in high conversions.

The use of formaldehyde to methylate amines and ammonia is not new in the art. Eschweiler (Ber., 28c, 581 (1895); Ber., 38, 880 (1905)) first described the methylation of ammonia and amines with formaldehyde. In this process, the methylation is carried out in a pressure vessel at a temperature of about 130 to 160° C. and at a pressure of about 1,000 p.s.i.g. The difficulties and potential hazards of these reaction conditions are apparent since one of the products of the reaction is carbon dioxide gas. The application of Eschweiler's process to the preparation of N,N′-dimethylpiperazines has resulted in low conversions and a product containing a considerable amount of entrapped carbon dioxide gas, which makes it difficult to separate and recover the desired product. Therefore, it is readily apparent that the Eschweiler process has several disadvantages.

Subsequently, Clarke et al. (J. Am. Chem. Soc., 55, 4571 (1933)) modified the Eschweiler process by carrying out the reaction at atmospheric pressure in the presence of formaldehyde and an excess of formic acid. While the Clarke et al. process improved conversion some, the high cost and corrosiveness of formic acid are undesirable.

It is apparent from the foregoing that each of the processes described has certain disadvantages which render it undesirable for the production of N,N′-dimethylpiperazines.

Therefore, an object of this invention is to provide a new and improved process for producing N,N′-dimethylpiperazines.

Another object of this invention is to provide a process for the methylation of piperazines with formaldehyde at atmospheric pressure.

Thus, it was surprisingly and unexpectedly discovered that N,N′-dimethylpiperazines are prepared in high conversions and the stated objects and other objects are accomplished by contacting a piperazine compound corresponding to the formula:

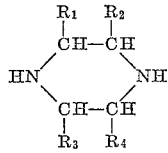

wherein $R_1$, $R_2$, $R_3$ and $R_4$ may be hydrogen, methyl or ethyl radicals which may be the same or different, with formaldehyde in the proportion of about 4 to 8 mols of formaldehyde per mol of piperazine compound in the presence of about 0.1 to 1.5 mols of sodium carbonate or potassium carbonate per mol of piperazine compound. The reaction takes place at a temperature of about 85 to 100° C. and at about atmosphere pressure.

When 2-methylpiperazine was methylated according to the Eschweiler process in a pressure vessel at a temperature of 150° C. and at a pressure of 1,000 p.s.i.g., the resulting conversion of 2-methylpiperazine to 1,2,4-trimethylpiperazine was 54%. In addition to the low conversion the resulting product was a foam due to the evolution of carbon dioxide gas during the reaction. Therefore, it was surprising indeed when it was discovered that the methylation of piperazines in the presence of sodium carbonate or potassium carbonate at a temperature of about 85 to 100° C. and at atmospheric pressure resulted in conversions of up to 89% and a product essentially free of carbon dioxide gas. It is apparent that the process of this invention differs considerably from Eschweiler's process not only in reaction temperature and pressure, but also in that the reaction is carried out in the presence of sodium carbonate or potassium carbonate and results in conversions vastly superior to those of the Eschweiler process.

The N,N′-dimethylpiperazines prepared by the process of this invention include both N,N′-dimethylpiperazine and N,N′-dimethylpiperazines having alkyl-substituted carbon atoms. Thus the compounds are tertiary amines which are useful as urethane foam catalysts and epoxy curing agents and may be represented by the following formula:

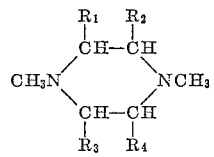

wherein $R_1$, $R_2$, $R_3$ and $R_4$ may be hydrogen, methyl or ethyl radicals which may be the same or different.

Representative of the piperazine compounds which may be employed in the reaction are piperazine,
2-methylpiperazine,
2,5-dimethylpiperazine,
2,6-dimethylpiperazine,
2,3-dimethylpiperazine,
2,3,5-trimethylpiperazine,
2,3,5,6-tetramethylpiperazine,
2-ethylpiperazine,
2,5-diethylpiperazine,
2,6-diethylpiperazine,
2,3,5,6-tetraethylpiperazine,
2-ethyl-5-methylpiperazine,
2,5-diethyl-3-methylpiperazine,
2-ethyl-3,5-dimethylpiperazine,
2,6-diethyl-3,5-dimethylpiperazine,
2-ethyl-3,5,6-trimethylpiperazine, and the like.

The formaldehyde employed in carrying out the reaction may be either in the form of an aqueous solution of formaldehyde or as paraformaldehyde. The quantity of formaldehyde used for the reaction should be about 4 to 8 mols of formaldehyde per mol of piperazine compound and preferably about 5 to 7 mols of formaldehyde per mol of piperazine compound to obtain the highest conversion. Although greater quantities of formaldehyde can be used, this is not recommended for economic reasons and later difficulties in recovery of the reaction product.

The sodium carbonate or potassium carbonate should be present in the reaction mixture in the proportion of about 0.1 to 1.5 mols of sodium carbonate or potassium carbonate per mol of piperazine compound and preferably 0.3 to 0.7 mol of sodium carbonate or potassium carbonate per mol of piperazine compound to obtain the highest conversions. Greater quantities result in lower conversions and should be avoided. However, it should be apparent from the foregoing that mixtures of sodium carbonate and potassium carbonate may be employed in the reaction mixture.

In carrying out the methylation reaction the order of mixing the reactants may vary. Preferably the piperazine compound is added slowly to the formaldehyde-sodium carbonate or potassium carbonate mixture while stirring. The reaction proceeds at about atmospheric pressure and at a temperature of about 85 to 100° C., preferably about 90 to 95° C. At the higher temperature range the rate of reaction is increased and the reaction time reduced to about 1 to 6 hours. During the reaction carbon dioxide gas is evolved and subsides when the methylation reaction is completed.

After the reaction is completed the N,N'-dimethylpiperazine compound is preferably recovered by first destroying the excess formaldehyde with sodium hydroxide and then rectifying the reaction mixture through a distillation column. The product is collected as a water-amine azeotrope which contains about 37% N,N'-dimethylpiperazine. To obtain the anhydrous N,N'-dimethylpiperazine the water-amine azeotrope is treated with sodium hydroxide to separate and dry the amine layer. Then distillation of the amine layer provides the pure N,N'-dimethylpiperazine. Conversions of up to 89% have been obtained by the use of the process of this invention.

The following examples are set forth to illustrate the process of the invention and should not be used to unduly restrict the scope of the invention as it has been described herein. The percent conversion to the N,N'-dimethylpiperazine product reported in the examples and previously mentioned was calculated as follows:

Percent conversion to N, N'-dimethylpiperazine (product)
$$= \frac{\text{mols of product obtained}}{\text{mols of piperazine charged}} \times 100$$

*Example 1*

A five-liter, three-necked flask equipped with stirrer, reflux condenser, thermometer and addition funnel was charged with 2430 grams (30 mols) of 37% aqueous formaldehyde solution and 265 grams (2.5 mols) of sodium carbonate. From the funnel 648 grams (5.0 mols) of 77.2% 2-methylpiperazine were added with mixing over about 30 minutes. The mixture was refluxed at 90 to 95° C. for 6 hours. The excess formaldehyde was then destroyed with sodium hydroxide solution and the mixture azeotropically distilled. Distillation and collection of the 96 to 99° C. fraction resulted in 1552 grams of the water-1,2,4-trimethylpiperazine azeotrope having an analysis of 37% 1,2,4-trimethylpiperazine. Thus the conversion was 89%.

*Example 2*

The flask described in Example 1 was charged with 2430 grams (30 mols) of 37% aqueous formaldehyde solution and 53 grams (0.5 mol) of sodium carbonate. 648 grams (5 mols) of 2-methylpiperazine were introduced slowly over 20 minutes into the flask. The mixture was refluxed at 90 to 95° C. for 1 hour. Sodium hydroxide solution was added to destroy the excess formaldehyde and the mixture was azeotropically distilled. 1466 grams of the water-1,2,4-trimethylpiperazine azeotrope having an analysis of 37% 1,2,4-trimethylpiperazine were collected which corresponded to an 84.0% conversion.

*Example 3*

The flask described in Example 1 was charged with 2430 grams (30 mols) of 37% aqueous formaldehyde solution and 530 grams (5 mols) of sodium carbonate. 648 grams (5 mols) of 2-methylpiperazine were introduced slowly over 10 minutes into the flask. The mixture was refluxed at 90 to 95° C. for 6 hours. The excess formaldehyde was then destroyed with sodium hydroxide solution and the mixture azeotropically distilled. Distillation and collection of the 96 to 99° C. fraction resulted in 1443 grams of the water-1,2,4-trimethylpiperazine azeotrope having an analysis of 35% 1,2,4-trimethylpiperazine or a conversion of 78%.

Thus the methylation of piperazines carried out at atmospheric pressure in the presence of a large excess of formaldehyde and in the presence of sodium carbonate or potassium carbonate results in high conversions and eliminates the disadvantages of Eschweiler's process and therefore is unquestionably a significant improvement in the preparation of N,N'-dimethylpiperazines.

I claim:

1. A process for preparing N,N'-dimethylpiperazines which comprises contacting a piperazine compound corresponding to the formula:

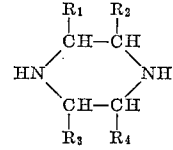

wherein $R_1$, $R_2$, $R_3$ and $R_4$ are members selected from the group consisting of hydrogen, methyl and ethyl radicals with formaldehyde in the proportion of about 4 to 8 mols of formaldehyde per mol of said piperazine compound in the presence of about 0.1 to 1.5 mols of a member selected from the group consisting of sodium carbonate and potassium carbonate per mol of said piperazine compound at a temperature of about 85 to 100° C. and at about atmospheric pressure.

2. A process for preparing N,N'-dimethylpiperazines which comprises contacting a pipearazine compound corresponding to the formula:

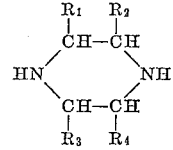

wherein $R_1$, $R_2$, $R_3$ and $R_4$ are members selected from the group consisting of hydrogen, methyl and ethyl radicals with formaldehyde in the proportion of about 5 to 7 mols of formaldehyde per mol of said piperazine compound in the presence of about 0.3 to 0.7 mol of a member selected from the group consisting of sodium carbonate and potassium carbonate per mol of said piperazine compound at a temperature of about 85 to 100° C. and at about atmospheric pressure.

3. A process for preparing N,N'-dimethylpiperazines which comprises contacting a piperazine compound corresponding to the formula:

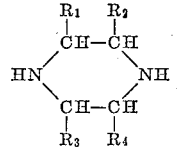

wherein $R_1$, $R_2$, $R_3$ and $R_4$ are members selected from the group consisting of hydrogen, methyl and ethyl radicals with formaldehyde in the proportion of about 5 to 7 mols of formaldehyde per mol of said piperazine compound in the presence of about 0.3 to 0.7 mol of sodium carbonate per mol of said piperazine compound at a temperature of about 90 to 95° C. and at about atmospheric pressure.

4. A process according to claim 3 wherein said piperazine compound is piperazine.

5. A process according to claim 3 wherein said piperazine compound is 2-methylpiperazine.

6. A process according to claim 3 wherein said piperazine compound is 2,5-dimethylpiperazine.

7. A process according to claim 3 wherein said piperazine compound is 2,6-dimethylpiperazine.

8. A process for preparing N,N'-dimethylpiperazines which comprises contacting a piperazine compound corresponding to the formula:

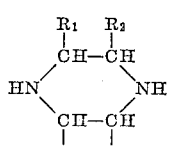

wherein $R_1$, $R_2$, $R_3$ and $R_4$ are members selected from the group consisting of hydrogen, methyl and ethyl radicals, with formaldehyde in the proportion of about 5 to 7 mols of formaldehyde per mol of said piperazine compound in the presence of about 0.3 to 0.7 mol of potassium carbonate per mol of piperazine compound at a temperature of about 90 to 95° C. and at about atmospheric pressure.

9. A process according to claim 8 wherein said piperazine compound is piperazine.

10. A process according to claim 8 wherein said piperazine compound is 2-methylpiperazine.

11. A process according to claim 8 wherein said piperazine compound is 2,5-dimethylpiperazine.

12. A process according to claim 8 wherein said piperazine compound is 2,6-dimethylpiperazine.

References Cited in the file of this patent

UNITED STATES PATENTS

| | | |
|---|---|---|
| 2,639,284 | Morren | May 19, 1953 |
| 2,859,216 | Pattison | Nov. 4, 1958 |

OTHER REFERENCES

Eschweiler: Chemische Berichte, 28c, 581 (1895).
Eschweiler: Chemische Berichte, 38, 880–882 (1905).